United States Patent
Hatti et al.

(10) Patent No.: US 7,769,198 B2
(45) Date of Patent: Aug. 3, 2010

(54) SYSTEM, METHOD, APPARATUS FOR REPEATING LAST LINE TO SCALAR

(75) Inventors: Mallinath Hatti, Bangalore (IN);
Lakshmanan Ramakrishnan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1314 days.

(21) Appl. No.: 10/754,322

(22) Filed: Jan. 9, 2004

(65) Prior Publication Data

US 2005/0163228 A1   Jul. 28, 2005

(51) Int. Cl.
*H04N 11/04* (2006.01)
*H04N 7/12* (2006.01)

(52) U.S. Cl. .................. 382/100; 375/240.28; 348/581; 348/E17.003

(58) Field of Classification Search ................. 345/603, 345/604; 382/100; 375/240.28; 348/581
See application file for complete search history.

(56) References Cited

U.S. PATENT DOCUMENTS

| | | | | |
|---|---|---|---|---|
| 5,670,993 | A * | 9/1997 | Greene et al. | 345/556 |
| 5,777,601 | A * | 7/1998 | Baker et al. | 345/603 |
| 5,850,572 | A * | 12/1998 | Dierke | 710/53 |
| 6,160,586 | A * | 12/2000 | Justiss et al. | 348/452 |
| 6,330,666 | B1 * | 12/2001 | Wise et al. | 712/300 |
| 6,429,836 | B1 * | 8/2002 | Hansen | 345/74.1 |
| 2002/0009287 | A1 * | 1/2002 | Ueda | 386/68 |
| 2002/0145613 | A1 * | 10/2002 | MacInnis et al. | 345/603 |

* cited by examiner

*Primary Examiner*—Bhavesh M Mehta
*Assistant Examiner*—Stephen R Koziol
(74) *Attorney, Agent, or Firm*—McAndrews Held & Malloy, Ltd.

(57) ABSTRACT

Presented herein are video decoding system(s), method(s), and apparatus for repeating a last line to a scalar or compositor or capture. A first parameter is provided to a first register indicating that a picture comprises a first number of lines, and a second parameter is provided to a second register, indicating that the picture comprises a second number of lines.

13 Claims, 4 Drawing Sheets

SYSTEM, METHOD, APPARATUS FOR REPEATING LAST LINE TO SCALAR

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

An MPEG decoder system is usually implemented as an off the shelf integrated circuit that is fused onto a mother board. Other end product functionalities are usually implemented as other board-level products. Because the decoding and other functionalities are usually manufactured separately, it is important to debug, test, and verify the video control functionality. Testing the video functionality can involve application of particular video control functions, e.g., reverse, fast forward, etc. However, given the number of frames per second, it is difficult for the human eye to determine the ordering of pictures displayed during testing.

Additionally, the testing can include the display of particular line patterns. However, a single line pattern may not appear large enough on a display for visual inspection. By repeating the line pattern for a number of lines, the test pattern can be observed as a set of vertical bars.

The repeated line pattern can be displayed by generation of a frame comprising the repeated lines. However, generation of the repeated lines disadvantageously consumes the bandwidth of the decoder system.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

Presented herein is a system, method, and apparatus for repeating a last line to a scalar.

In one embodiment, there is presented a method for displaying a picture. The method comprises providing a first parameter to a first register indicating that the picture comprises a first number of lines and providing a second parameter to a second register, indicating that the picture comprises a second number of lines.

In another embodiment, there is presented a decoder system for displaying a picture. The decoder system comprises a feeder, a scalar, and a controller. The feeder fetches lines of the picture. The scalar scales lines of the picture. The controller provides a first parameter to the feeder indicating that the picture comprises a first number of lines and provides a second parameter to the scalar indicating that the picture comprises a second number of lines.

In another embodiment, there is presented a circuit for displaying a picture. The circuit comprises a feeder, a scalar, and a controller. The scalar is connected to the feeder. The controller is connected to the feeder and the scalar. The controller is operable to program a feeder with a first parameter indicating that the picture comprises a first number of lines and program a scalar with a second parameter indicating that the picture comprises a second number of lines.

These and other advantages and novel features of the present invention, as well as details of an illustrated embodiment thereof, will be more fully understood from the following description and drawings.

DETAILED DESCRIPTION OF THE INVENTION

Figure 1:
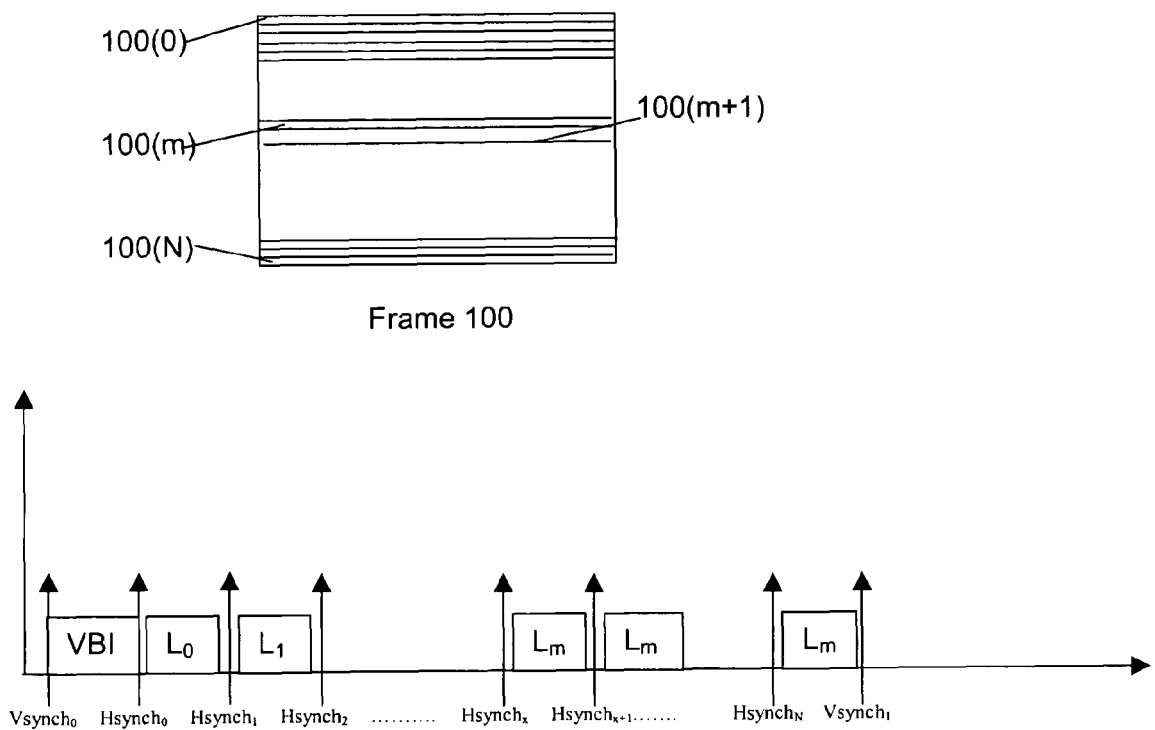
FIG. 1 is a block diagram describing a display of a repeated last line of a picture in accordance with an embodiment of the present invention.

Referring now to FIG. 1, there is illustrated a display of a repeated last line of a picture in accordance with an embodiment of the present invention. A picture 100 comprises any number of lines 100(0) . . . 100(N). However, for testing purposes, a line 100(m) comprising a pixel pattern 105 is repeated, from line 100(m) through line 100(n).

As a result of repeating the pixel pattern of line 100(m) for lines 100(m) . . . 100(N), the bottom portion of the picture 100 displays a set of vertical bars. The width of the vertical bars is preferably wide enough for visual detectability.

The process of displaying a picture 100 scanning the frame involves providing the pixels of the picture 100 at specific time intervals that are synchronized to a raster scan in a display device. The display device usually receives the pictures from another device that is attached to, but was manufactured separately from the display device. The device providing the pictures and the display device are synchronized by means of a vertical synchronization pulses Vsynch and horizontal synchronization pulses Hsynch. The display device signifies the beginning of a time period for the display of a picture by transmitting a vertical synchronization pulse (Vsynch) The display device signifies the time period for displaying a new line in a picture 100( ) by transmitting a horizontal synchronization pulse Hsynch. The device providing the pictures uses the foregoing vertical/horizontal synchronization pulses to follow the timing of the display device, and provides the appropriate line 100(x) of the appropriate picture 100 for display at the appropriate time.

The picture 100 is stored in and scanned from a frame buffer. Displaying the picture 100 wherein lines 100(m) . . . 100(N) comprises repeating pixel patterns 105 can be accomplished by storing and scanning each line 100(0) . . . 100(N) from the frame buffer. However, the foregoing disadvantageously consumes memory in the frame buffer. Additionally, the foregoing also consumes processor cycles for calculating the addresses in the frame buffer that stores lines 100(m) . . . 100(N).

Memory in the frame buffer can be saved by only writing line 100(0) . . . 100(m) to the frame buffer. Because lines 100(m+1) . . . 100(N) comprise the same pixel pattern 105, line 100(m) can be repeatedly scanned during the $Hsynch_{m+1} \ldots Hsynch_N$. The foregoing also saves processing cycles by avoiding the calculation of the frame buffer addresses storing lines 100(m+1) . . . 100(N).

Figure 2:
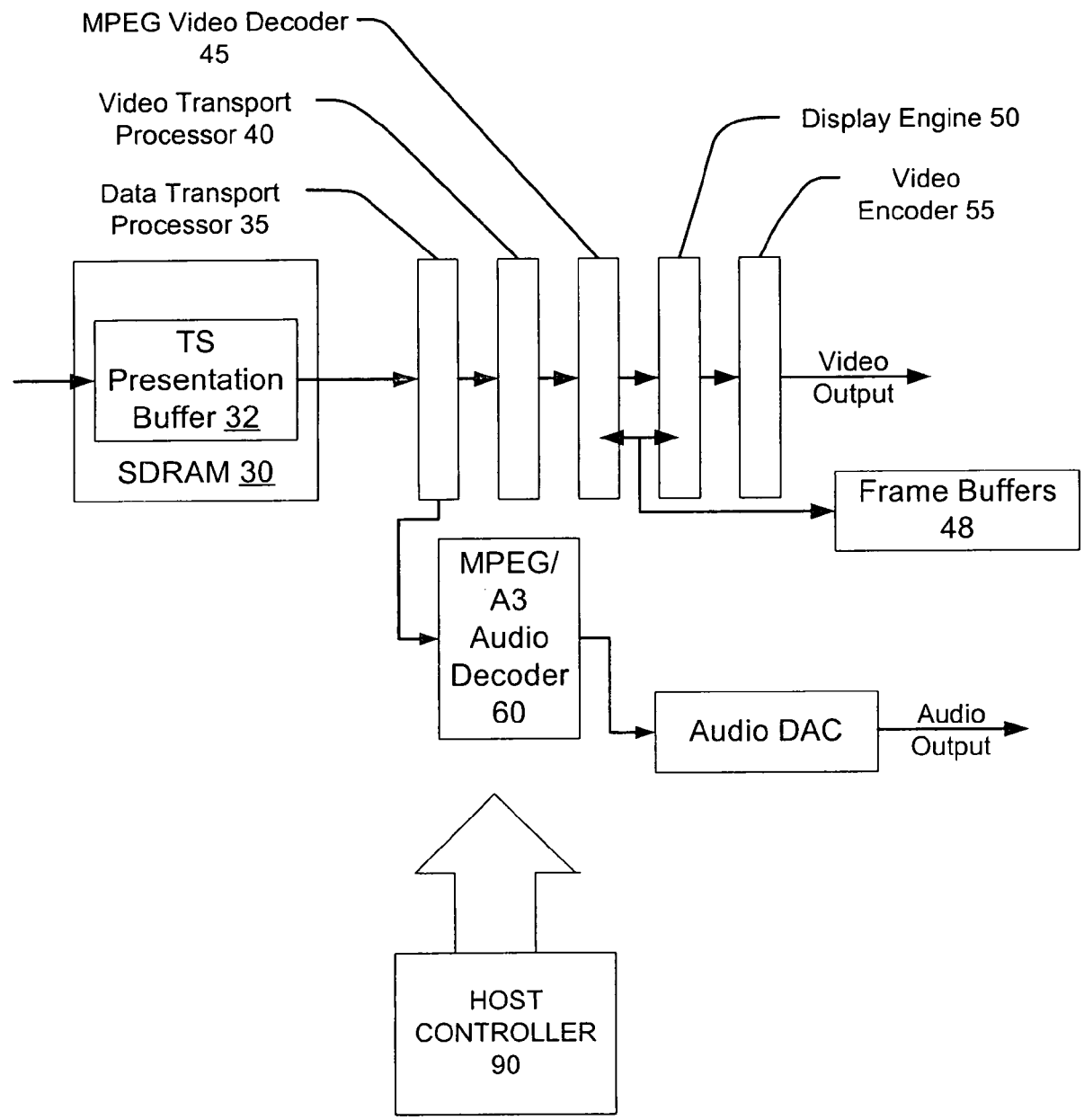
FIG. 2 is a block diagram describing an exemplary decoder system in accordance with an embodiment of the present invention.

Referring now to FIG. 2, there is illustrated a block diagram describing an exemplary decoder system for providing pictures for display to a display device in accordance with an embodiment of the present invention. A processor, that may include a CPU 90, reads transport bitstream 65 into a transport bitstream buffer 32 within an SDRAM 30.

The data is output from the transport bitstream buffer 32 and is then passed to a data transport processor 35. The data transport processor 35 then demultiplexes the transport bitstream 65 into constituent transport bitstreams. The constituent packetized elementary bitstream can include for example, video transport bitstreams, and audio transport bitstreams. The data transport processor 35 passes an audio transport bitstream to an audio decoder 60 and a video transport bitstream to a video transport processor 40.

The video transport processor 40 converts the video transport bitstream into a video elementary bitstream and provides the video elementary bitstream to a video decoder 45. The video decoder 45 decodes the video elementary bitstream, resulting in decoded video pictures. The decoding can include decompressing the video elementary bitstream. The decoded video data includes pictures. The pictures are stored in a frame buffer 48.

The display engine 50 is responsible for providing a display signal to a display device, such as a monitor or a television. The process of providing a display signal includes fetching the appropriate pixels from the frame buffer 48, and scaling the picture 100. The display device and the display engine 50 are synchronized by horizontal and vertical synchronization pulses. At each horizontal synchronization pulse, the display engine 50 provides a particular line to the display device for display. To provide the particular line to the display device for display, an address in the frame buffer 48 storing the first pixel of the line for display is calculated. The address is calculated by either the host controller 90 or, alternatively the display engine 50.

A frame 100 comprises any number of lines 100(0) . . . 100(N). However, for testing purposes, a line 100(m) comprising a pixel pattern 105 is repeated, from line 100(m) through line 100(n). Displaying the picture 100 wherein lines 100(m) . . . 100 (N) comprises repeating pixel patterns 105 can be accomplished by storing and scanning each line 100(0) . . . 100(N) from the frame buffer. However, the foregoing disadvantageously consumes memory in the frame buffer. Additionally, the foregoing disadvantageously consumes processor cycles for calculation of the addresses for the first pixels in lines 100(m+1) . . . 100(N).

Memory in the frame buffer can be saved if the video decoder 45 writes lines 100(0) . . . 100(m) to the frame buffer. Because lines 100(m+1) . . . 100(N) comprise the same pixel pattern 105, the decoder engine 50 can repeatedly scan line 100(m) during the $Hsynch_{m+1}$ . . . . $Hsynch_N$. The foregoing also saves processing cycles by avoiding the calculation of the frame buffer addresses storing lines 100(m+1) . . . 100(N).

In order to cause the display engine 50 to repeatedly scan out line 100(m) during $Hsynch_m$ . . . . $Hsynch_N$, the host controller programs the portion of the display engine 50 responsible for fetching the pixels from the frame buffer 48 with a parameter indicating that the picture 100 comprises m+1 lines in the vertical direction, while programming the portion of the display engine 50 responsible for scaling the picture 100 with a parameter indicating the picture 100 comprises N+1 lines.

Responsive thereto, during $Hsynch_0$ . . . $Hsynch_m$, the portion of the display engine 50 that fetches the pixels of the picture 100, fetches the pixels for lines 100(0) . . . 100(m) from the frame buffer 48. After $Hsynch_m$, the portion of the display engine 50 responsible for scaling requests lines 100 (m+1) . . . 100(N). However, because the portion of the display engine 50 that fetches the pixels of the picture 100 from the frame buffer 48 is programmed with an indicator indicating that the picture 100 comprises only m+1 lines, by default, the last line, line 100(m) is repeatedly provided during each subsequent Hsynch, $Hsynch_{m+1}$ . . . $Hsynch_N$.

Figure 3:
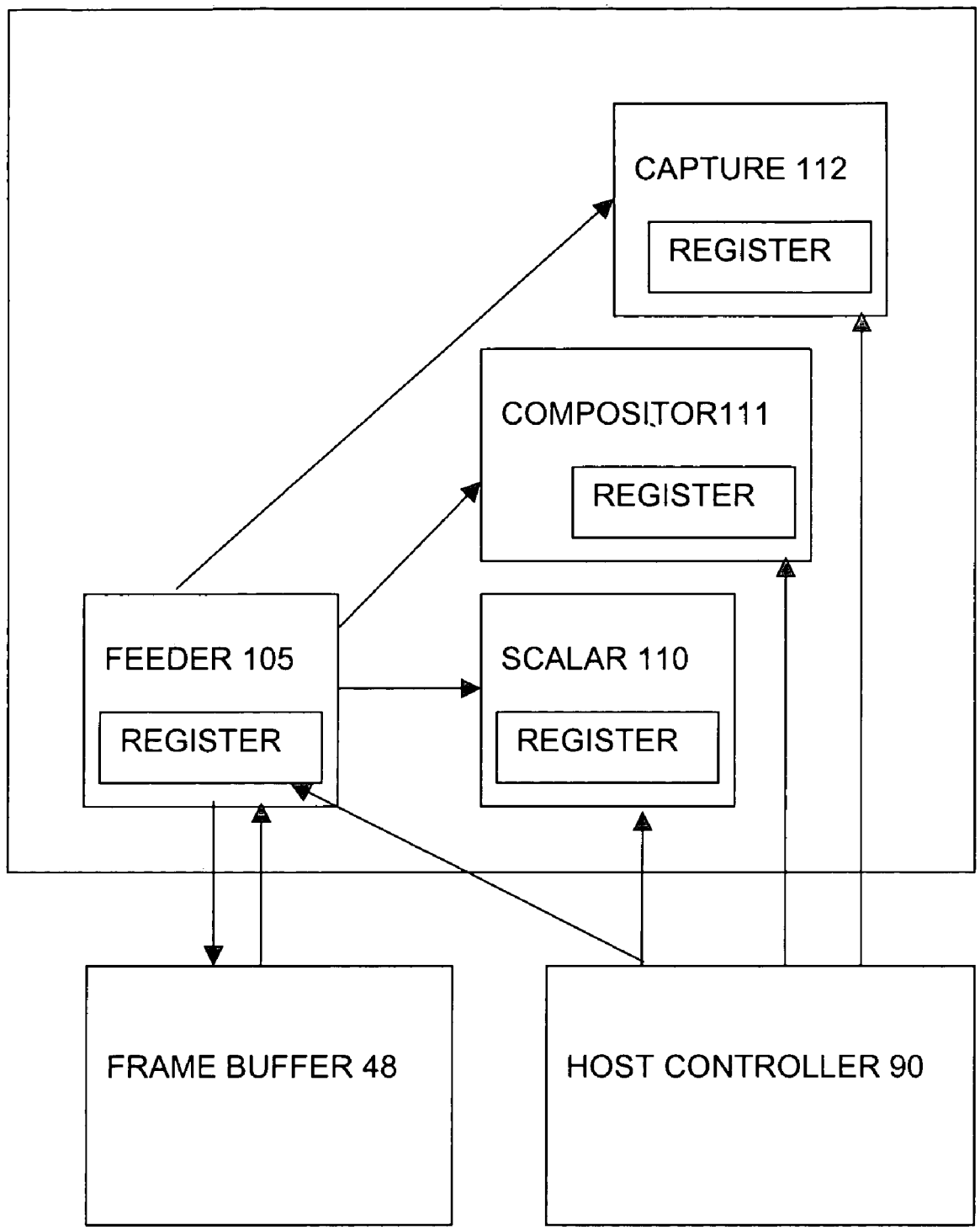
FIG. 3 is a block diagram of the video decoder and the display engine in accordance with an embodiment of the present invention.

Referring now to FIG. 3, there is illustrated a block diagram describing an exemplary display engine 50 in accordance with an embodiment of the present invention. The display engine 50 is responsible for providing a display signal to a display device, such as a monitor or a television. The display engine 50 comprises a feeder 105 for fetching appropriate pixels from the frame buffer 48, a scalar 110 for scaling the picture 100, a compositor 111 for composing multiple video/graphics layers from different feeders and video capture 112 for capturing the output video to the DRAM for playback applications. At each horizontal synchronization pulse $Hsynch_0$ . . . $Hsynch_m$, the scalar 110 requests a line from the feeder 105. Responsive to the request, the feeder 105 fetches a particular line 100( ) of the picture 100 from the frame buffer 48.

In order to cause the display engine 50 to repeatedly scan out line 100(m) during $Hsynch_m$ . . . $Hsynch_N$, the host controller programs the feeder 105, via a register therein, with a parameter indicating that the picture 100 comprises m+1 lines in the vertical direction, while programming the scalar 110, via a register therein, with a parameter indicating the picture 100 comprises N+1 lines.

During $Hsynch_0$ . . . $Hsynch_m$, the scalar 110 requests a line from the feeder 105. Responsive thereto, the feeder 105 fetches the pixels for lines 100(0) . . . 100(m) from the frame buffer 48 and provides the pixels for lines 100(0) . . . 100(m) to the scalar 110. After $Hsynch_m$, the scalar 110 requests lines 100 (m+1) . . . 100(N). However, because the feeder 105 is programmed with an indicator indicating that the picture 100 comprises only m+1 lines, by default, the feeder 105 continues fetch and provides the last line, line 100(m), during each subsequent Hsynch, $Hsynch_{m+1}$ . . . . $Hsynch_N$.

Figure 4:
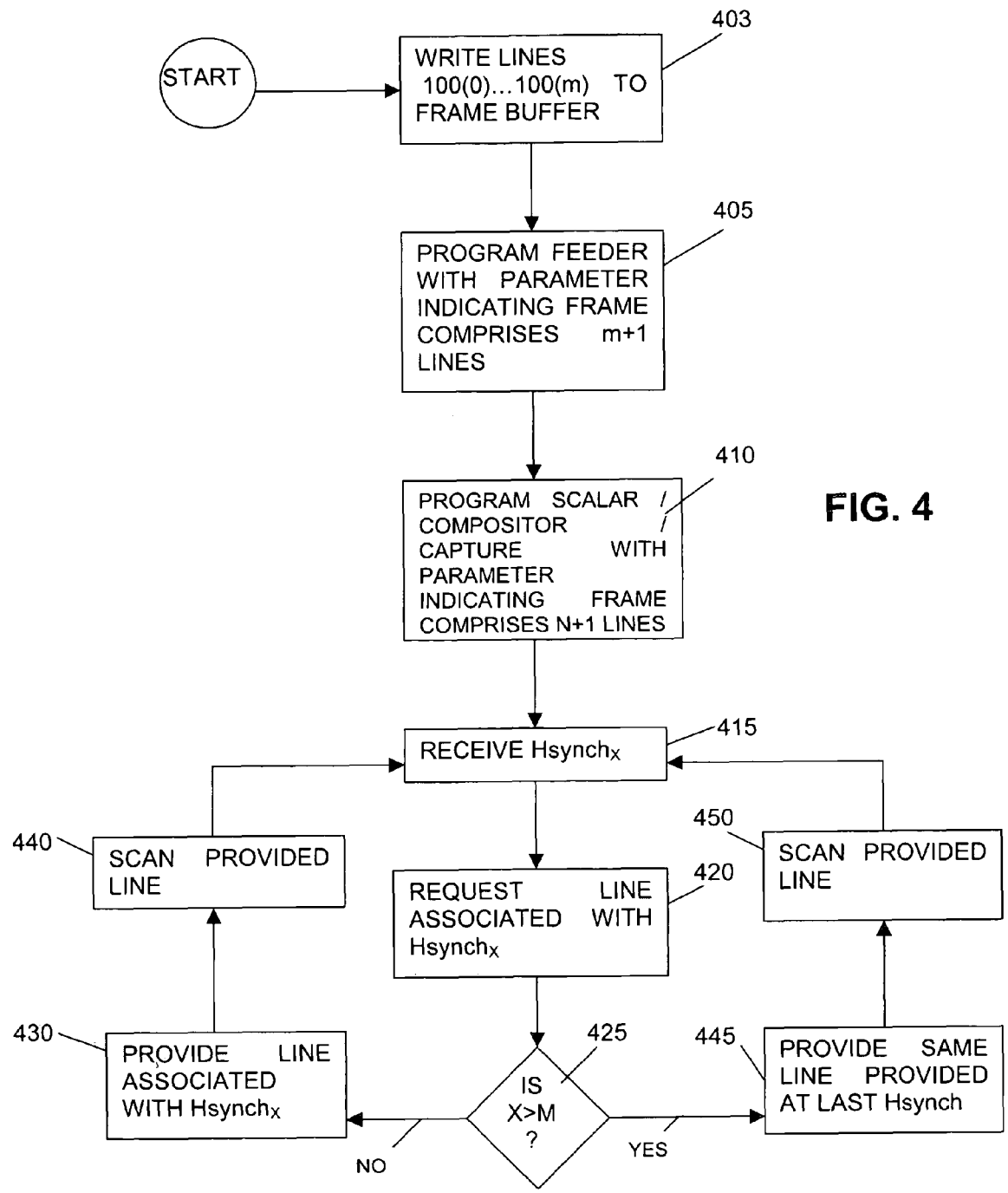
FIG. 4 is a flow diagram for repeating a last line of a picture in accordance with an embodiment of the present invention.

Referring now to FIG. 4, there is illustrated a flow diagram for displaying a picture in accordance with an embodiment of the present invention. At 403, the video decoder 45 writes lines 100(0) . . . 100(m) to frame buffer 48. At 405, the host controller 90 programs the feeder 105 with a parameter indicating that the display picture 100 comprises m+1 lines. At 410, the processor 90 programs the scalar 110 with a parameter indicating that the display picture 100 comprises N+1 lines, where N>m.

At 415, a horizontal synchronization pulse, $Hsynch_x$ (where x is a variable) is received. Responsive thereto, at 420, the scalar 110 requests the line 100( ) associated with the Hsynch. At 425, a determination is made whether the Hsynch received during 415 is associated with a line after line 100(m), i.e., x>m.

If at 425, x is not greater than m, the feeder 105 fetches and provides (430) the line 100(x) associated with the $Hsynch_x$ received during 415, the scalar 110 scans (440) out line 100(x) provided during 435, and 415-425 are repeated. However, if x exceeds m, at 445, the feeder 105 provides the same line provided during the last Hsynch received at 415. At 450, scalar 110 scans the line provided at 445. As can be seen, the feeder 105 provides line (at 430) 100(x) responsive to $Hsynch_x$, for x=0 . . . m. At x=m+1, x>m, and the feeder 105 fetches and provides (at 435) the same line provided during the last Hsynch, line 100(m) during $Hsynch_m$. For each subsequent Hsynch$_{m+2}$, the feeder 105 provides same line, 100 (m), provided at 435. The foregoing is repeated until receipt of a vertical synchronization pulse Vsynch at 455.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for displaying a picture, said method comprising:
   providing a first parameter to a first register indicating that the picture comprises a first number of lines, wherein the first parameter is determined by setting the first parameter to a line number associated with a desired line for repeating;
   providing a second parameter to a second register, indicating that the picture comprises a second number of lines, wherein the second parameter is determined by setting the second parameter to a number of lines to be displayed;
   receiving horizontal synchronization pulses;
   providing the particular one of the first number of lines for scaling or composing or capturing for the horizontal synchronization pulses that are associated with particular ones of the first number of lines; and
   repeatedly providing a last of the first number of lines for scaling or composing or capturing for each of the horizontal synchronization pulses that are associated with line numbers that exceed the first number of lines, from memory addresses, wherein the last of the first number of lines is provided from the same memory addresses during each repetition.

2. The method of claim 1, further comprising:
   if the horizontal synchronization pulse is associated with a particular one of the first number of lines, fetching the particular one of the first number of lines for scaling or composing or capturing; and
   if the horizontal synchronization pulse is not associated with a particular one of the first number of lines, fetching a last of the first number of lines for scaling or composing or capturing.

3. A decoder system for displaying a picture, said decoder comprising:
   a feeder for fetching lines of the picture;
   a scalar for scaling lines of the picture;
   a compositor composing multiple video/graphics layers;
   a video capture capturing the picture into DRAM and
   a controller for providing a first parameter to the feeder indicating that the picture comprises a first number of lines and providing a second parameter to the scalar or compositor or capture indicating that the picture comprises a second number of lines, wherein the first parameter is determined by setting the first parameter to a line number associated with a desired line for repeating and wherein the second parameter is determined by setting the second parameter to a number of lines to be displayed; and
   wherein the feeder repeatedly fetches the desired line for repeating from the same memory addresses during each repetition.

4. The decoder system of claim 3, wherein the feeder comprises a register for storing the first parameter and wherein the scalar or compositor or capture comprises a register for storing the second parameter.

5. The decoder system of claim 3, wherein the scalar or compositor or capture receives horizontal synchronization pulses, and wherein the feeder provides the particular one of the first number of lines for scaling or composing or capturing for the horizontal synchronization pulses that are associated with particular ones of the first number of lines and repeatedly provides a last of the first number of lines for scaling or composing or capturing for each of the horizontal synchronization pulses that are associated with line numbers that exceed the first number of lines.

6. The decoder system of claim 5, wherein the feeder fetches a particular one of the first number of lines for scaling or composing or capturing that is associated with the horizontal synchronization pulse, if the horizontal synchronization pulse is associated with any of the first number of lines and fetches a last of the first number of lines for scaling or composing or capturing if the horizontal synchronization pulse is not associated with any of the first number of lines.

7. A circuit for displaying a picture, said circuit comprising:
   a feeder;
   a scalar connected to the feeder;
   a compositor connected to the feeder;
   a video capture connected to the feeder; and
   a controller connected to the feeder, the scalar, the compositor, the capture and the controller operable to program a feeder with a first parameter indicating that the picture comprises a first number of lines and program a scalar or compositor or capture with a second parameter indicating that the picture comprises a second number of lines, wherein the first parameter is determined by setting the first parameter to a line number associated with a desired line for repeating and wherein the second parameter is determined by setting the second parameter to a number of lines to be displayed; and
   wherein the feeder is operable to repeatedly fetch the desired line for repeating from the same memory addresses during each repetition.

8. The circuit of claim 7, further comprising:
   memory connected to the controller, said memory storing a plurality of instructions, wherein execution of the plurality of instructions by the controller causes:
      programming the feeder with the first parameter indicating that the picture comprises a first number of lines; and
      programming the scalar or compositor or capture with the second parameter indicating that the picture comprises a second number of lines.

9. The circuit of claim 7, the feeder comprising a register storing the first parameter, the scalar or compositor or capture comprising a register storing the second parameter, and the controller operable to write the first parameter to the first register and the second parameter to the second register.

10. The circuit of claim 9, wherein the scalar or compositor or capture receives a horizontal synchronization pulse and is operable to request a line of the picture associated with the horizontal synchronization pulse.

11. The circuit of claim 10, wherein the feeder is operable to provide a particular one of the first number of lines for scaling that is associated with the horizontal synchronization pulse, if the horizontal synchronization pulse is associated with any of the first number of lines and provide a last of the first number of lines for scaling or composing or capturing if the horizontal synchronization pulse is not associated with any of the first number of lines.

12. The circuit of claim 11, wherein the feeder is operable to fetch a particular one of the first number of lines for scaling that is associated with the horizontal synchronization pulse, if the horizontal synchronization pulse is associated with any of the first number of lines and fetch a last of the first number of lines for scaling or composing or capturing if the horizontal synchronization pulse is not associated with any of the first number of lines.

13. The method of claim 1, wherein the first number and the second number indicate a number of luma lines.

\* \* \* \* \*